(12) United States Patent
Shah et al.

(10) Patent No.: US 10,796,573 B2
(45) Date of Patent: Oct. 6, 2020

(54) CROWD-BASED VEHICULAR GEOFENCING

(71) Applicant: Ford Global Technologies, LLC, Dearborn, MI (US)

(72) Inventors: Ayush Shah, Belleville, MI (US); Oleg Yurievitch Gusikhin, Commerce Township, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 324 days.

(21) Appl. No.: 15/871,666

(22) Filed: Jan. 15, 2018

(65) Prior Publication Data
US 2019/0221120 A1 Jul. 18, 2019

(51) Int. Cl.
| | | |
|---|---|---|
| *G08G 1/0967* | (2006.01) | |
| *H04W 4/40* | (2018.01) | |
| *H04W 4/021* | (2018.01) | |
| *B60W 30/14* | (2006.01) | |

(52) U.S. Cl.
CPC ..... *G08G 1/096725* (2013.01); *B60W 30/146* (2013.01); *H04W 4/021* (2013.01); *H04W 4/40* (2018.02); *B60W 2555/60* (2020.02); *B60W 2710/18* (2013.01)

(58) Field of Classification Search
CPC .. G08G 1/096725; H04W 4/40; H04W 4/021; B60W 30/146; B60W 2550/22; B60W 2710/18
See application file for complete search history.

(56) References Cited

U.S. PATENT DOCUMENTS

| | | | | |
|---|---|---|---|---|
| 6,008,740 | A * | 12/1999 | Hopkins | G08G 1/096716 340/460 |
| 6,285,943 | B1 * | 9/2001 | Boulter | G08G 1/096725 180/170 |
| 10,410,516 | B1 * | 9/2019 | Andersson | G08G 1/096725 |
| 2007/0115101 | A1 * | 5/2007 | Creekbaum | B60R 25/102 340/426.22 |
| 2008/0231475 | A1 * | 9/2008 | Ramos | G08G 1/096716 340/995.27 |
| 2009/0140886 | A1 * | 6/2009 | Bender | B60R 25/00 340/988 |
| 2010/0094500 | A1 * | 4/2010 | Jin | G01C 21/26 701/31.4 |
| 2011/0307165 | A1 * | 12/2011 | Hiestermann | G01C 21/32 701/119 |
| 2014/0258201 | A1 * | 9/2014 | Finlow-Bates | G01S 19/42 706/46 |
| 2014/0292511 | A1 * | 10/2014 | Sheha | G01C 21/20 340/539.13 |
| 2015/0095355 | A1 * | 4/2015 | Patton | G06F 16/29 707/754 |

(Continued)

*Primary Examiner* — Yazan A Soofi
(74) *Attorney, Agent, or Firm* — Michael Spenner; Brooks Kushman, P.C.

(57) ABSTRACT

A vehicle includes a powertrain. The vehicle includes a controller configured to operate the powertrain according to the heading based speed limits such that, for a predefined region of a particular road, a maximum speed allowed by the heading based speed limits is less for headings toward a specified crowd density location than for headings away from the specified crowd density location. The powertrain operation is responsive to being within a crowd density defined geofence having heading based speed limits.

14 Claims, 3 Drawing Sheets

(56) References Cited

U.S. PATENT DOCUMENTS

| | | | |
|---|---|---|---|
| 2015/0163629 A1* | 6/2015 | Cheung | H04W 4/021 455/456.1 |
| 2015/0235266 A1* | 8/2015 | Jain | H04W 4/021 705/14.58 |
| 2015/0326624 A1* | 11/2015 | Rajendran | H04L 67/12 709/204 |
| 2017/0026786 A1* | 1/2017 | Barron | H04W 4/021 |
| 2018/0012492 A1* | 1/2018 | Baldwin | B60T 7/00 |
| 2018/0262903 A1* | 9/2018 | Ryan | H04W 4/90 |
| 2019/0304035 A1* | 10/2019 | Zaatarah | G06Q 50/01 |
| 2019/0364383 A1* | 11/2019 | Zises | H04W 4/08 |

* cited by examiner

CROWD-BASED VEHICULAR GEOFENCING

TECHNICAL FIELD

This disclosure relates to crowd-based geofencing of vehicles.

BACKGROUND

Static speed limits are used to reduce vehicle speeds. Speed limits, however, are not always followed and enforceable.

SUMMARY

A vehicle includes a powertrain. The vehicle includes a controller configured to operate the powertrain according to the heading based speed limits such that, for a predefined region of a particular road, a maximum speed allowed by the heading based speed limits is less for headings toward a specified crowd density location than for headings away from the specified crowd density location. The powertrain operation is responsive to being within a crowd density defined geofence having heading based speed limits.

A vehicle includes a powertrain. The vehicle includes a controller configured to operate the powertrain according to the heading based speed limits such that, for a predefined region of a particular road, a maximum speed allowed by the heading based speed limits is less for distances closer to the location than for distances farther from the location. The operation may be responsive to being within a crowd density defined geofence having heading based speed limits.

A vehicle method includes, responsive to being within a crowd density defined geofence having heading based speed limits, operating by a controller a powertrain according to the heading based speed limits such that, for a predefined region of a particular road, a maximum speed allowed by the heading based speed limits is less for headings toward a specified crowd density location than for headings away from the specified crowd density location The maximum speed allowed by the heading based speed limits may be less for distances closer to the location than for distances farther from the location.

The maximum speed allowed by the heading based speed limits may be less for headings centripetal to a centroid of the geofence than for headings orbiting the centroid.

The geofence may be based on a cluster of attendees defined by the crowd density being above a crowd density threshold.

The crowd density threshold may be based on an average attendee density of sectors within the geofence.

The crowd density may be based on mobile device location data.

DETAILED DESCRIPTION

Embodiments of the present disclosure are described herein. It is to be understood, however, that the disclosed embodiments are merely examples and other embodiments may take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Vehicles may be governed by a controller connected to a powertrain. The controller may govern the powertrain based on speed limits. The vehicle may receive speed limits from sources offboard the vehicle or calculate the speed limits onboard. The speed limits may be based on the vehicle's heading. The speed limits may be further calculated in relation to a geofence. The geofence may be defined by a crowd. For example, a crowd may be identified by a backend server. As the backend server collects device data, the density of those devices is calculated to determine whether a crowd has formed. The governor of the vehicle may be configured to restrict vehicle speeds when it is traveling near the crowd or traveling toward the crowd. The speed limits govern the vehicle below a heading based speed limit or maximum speed. The maximum speed may be defined by direction in relation to the cluster and distance from the cluster. Indeed, a vehicle's speed may be restricted based on proximity and heading in relation to dense crowds via geofencing.

Figure 1:
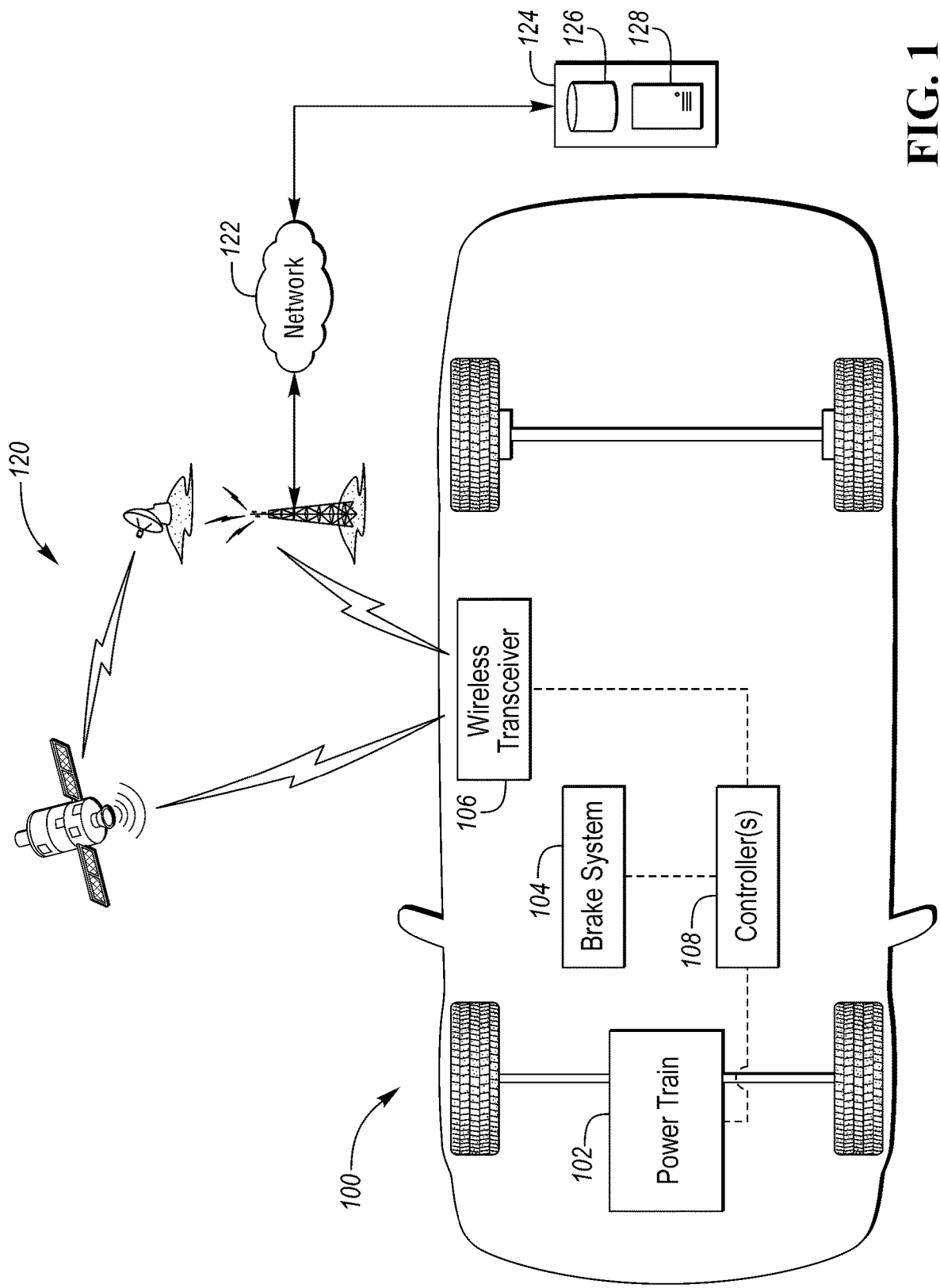
FIG. 1 is a schematic diagram of a vehicle and its communication systems.

Referring to FIG. 1, a vehicle 100 is shown. The vehicle 100 includes a powertrain 102, a brake system 104, a wireless transceiver 106, and a controller 108. The controller 108 receives heading based speed limits from the wireless transceiver 106. The controller controls the vehicle's brake system 104 and powertrain 102 based on vehicle speed indications and the heading based speed limits. The heading based speed limits may be sent over a wireless network 122 through wireless communication devices 120.

A backend server 124 is configured to receive device information representative of a crowd. For example, mobile devices carried by customers, gatherers, or patrons may be collected by the backend server 124 and stored in a datastore 126. The datastore 126 is connected to a processor 128 and other hardware. The backend server 124 may collect information from the internet, internet service providers, or other location tracking services. The backend server 124 uses clustering algorithms to determine whether a critical mass of individuals has gather to warrant the use of a geofence.

Figure 2:
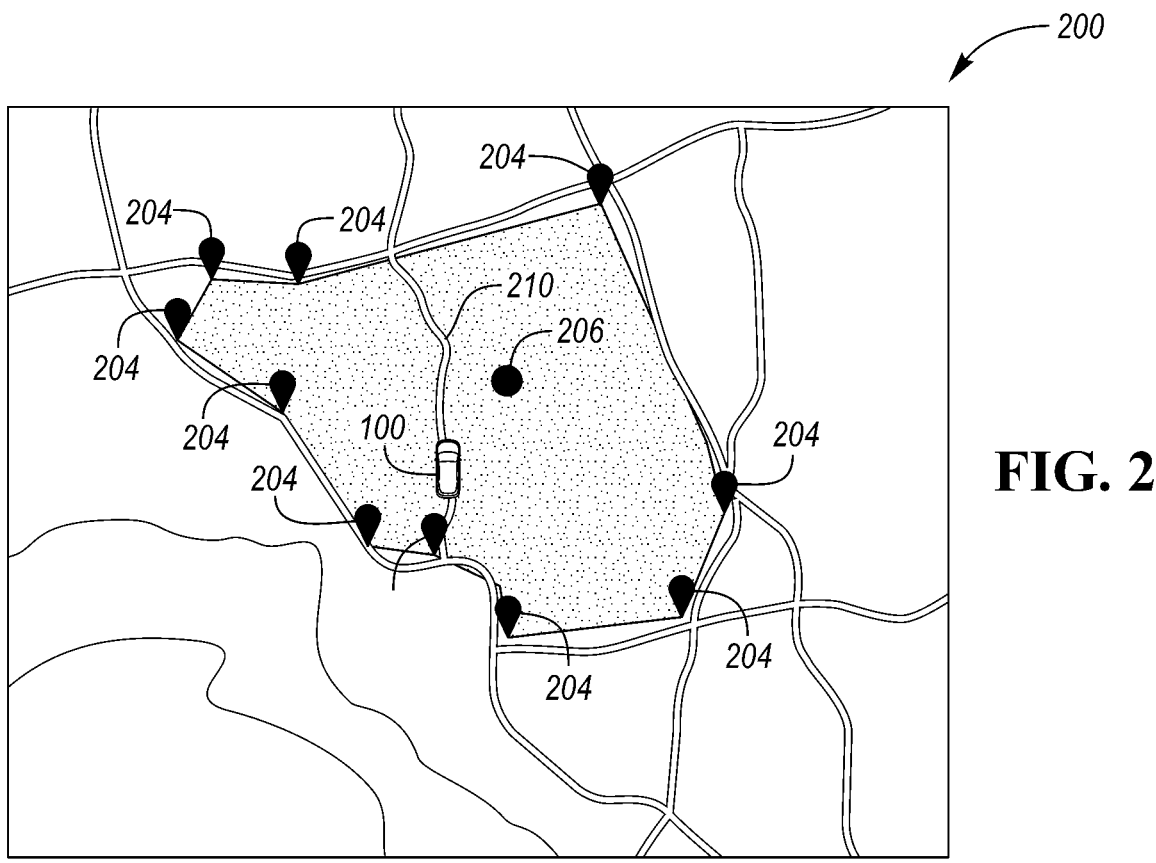
FIG. 2 is a map of a vehicle traveling within a geofenced area defined by a geographic perimeter.

For example, k-means partition clustering or other data analysis methods may determine where crowds have gathered. A crowd density may be determined using DBSCAN or another implement. For clusters that are found, a perimeter geofence may be created, as shown in FIG. 2. Additionally, density based concentric circles may be formed from the centroid of the cluster. It should be appreciated that the raw data may be sent to the vehicle for calculation or the heading based speed limits may be sent the vehicle. All calculations can be performed in either location.

A crowd density threshold for the creation of a geofence in a particular area may be based on a variety of factors (e.g., time of day, political activity, holiday). For example, the threshold to generate a geofence may be lower when political activists are congregating. Additionally, important events may further lower the threshold. For example, a Christmas Market or other seasonal tourist attraction being known may cause the backend server to lower the threshold. Roadside units may be used in combination with the vehicle over dedicated short range communications (DSRC) to designate whether the vehicle is on the roadway or off the roadway. In a similar way, the heading based speed limits toward the area are slower, heading based speed limits off of a roadway may be slower than speeds on a roadway.

Referring to FIG. 2, a map 200 including a geofence 204 is shown. The geofence 204 is positioned with the centroid 206 of a machine learning algorithm. The perimeter of the geofence 204 is created by major roads based on the centroid or the density of the cluster. A vehicle 100 is located within the geofence 204 along road 210. For a predefined region of road 210, a heading based speed limit may be set on the vehicle. Meaning, if a group of people are located around centroid 206, the vehicle 100—as it travels toward 206—will have a governed speed limit that is less than the posted limit. For example, the posted limit may be 55 miles per hour (MPH) along 210, but because the vehicle is located within the crowd density defined geofence, the vehicle may be required to travel at 25 MPH. As the vehicle 100 passes the centroid 206, the vehicle may increase speeds because the heading based speed limit is greater for headings going away from the centroid.

Figure 3:
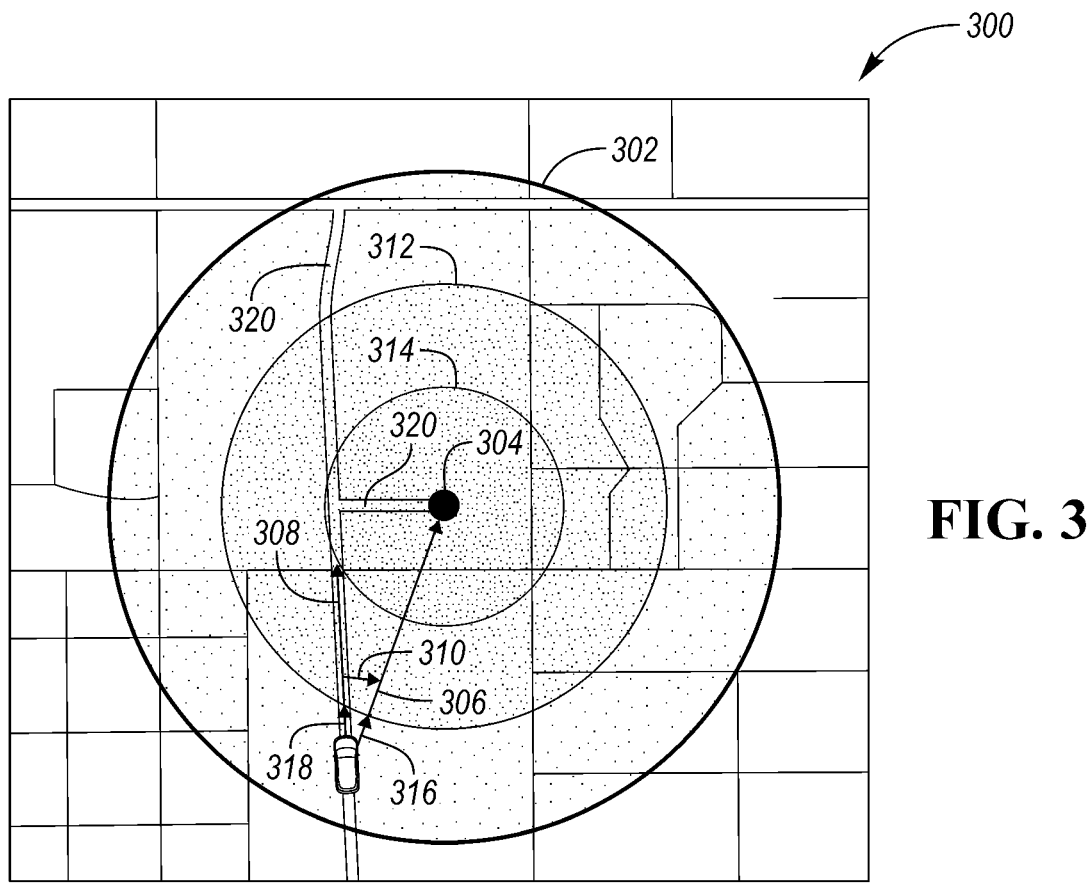
FIG. 3 is a map of a vehicle traveling within a geofenced area defined by a radial perimeter.

Referring to FIG. 3, a map 300 is shown including concentric geofence clusters 302, 312, 314, circumscribing centroid 304. As a vehicle 100 travels along road 320, it crosses the least dense cluster 302. As soon as cluster 302 is crossed, a heading based speed limit ensures the vehicle 100 does not exceed a predetermined speed. The global position information or other position data may be used to determine the heading 308 of the vehicle 100. The direction of travel respective the centroid 306 may be used to determine whether the heading 308 of the vehicle 100 is toward or away from the centroid 304. The heading 308 information may also determine a respective angle 310. The maximum speed of the vehicle 100 allowed may be less for distances, based on centripetal 306, closer to the centroid 304 than for distances farther from the location. The maximum speed allowed for the vehicle is less for headings centripetal 306 to a centroid 304 of the geofence than for headings orbiting the centroid 304. Additionally, the maximum speed allowed by the heading based speed limits may be based on an angle 310 between the centripetal 306 and the heading 308.

For non-circular clusters and for density specific heading based speed limits, density unique headings 318 and centripetals 316 are used. The unique heading 318 and 316 are particular to each density level 302, 312, 314 and enable heading based speed limits within each density level 302, 312, 314 and in relation to each density level 302, 312, 314. The density levels 302, 312, 314 are representative of a cluster of attendings have a particular density level.

The density level may be averaged across predefined units or sectors to determine a density baseline or to serve as a density unit. In one sense, density may be defined by the number of mobile device location data received at the backend server for every 100 square meters. Further, the clusters may be non-concentric. The cluster borders may be based on a density threshold, that is set in the k-means DBSCAN algorithm. Meaning, each cluster is defined by the topographical contours representative of density and not a geometric shape.

Figure 4:
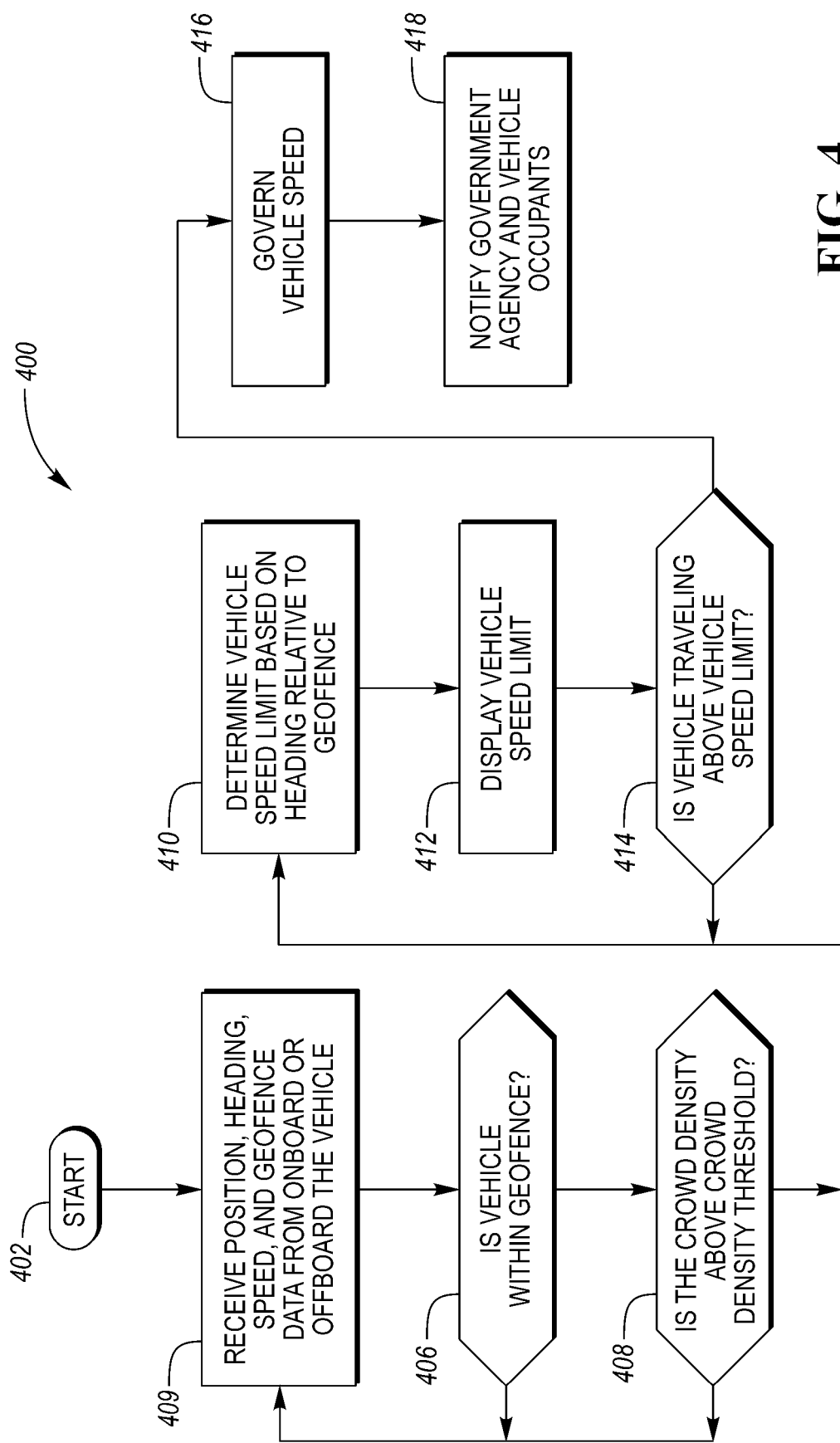
FIG. 4 is an algorithm for controlling the maximum speed of a vehicle.

Referring to FIG. 4, an algorithm 400 is shown. The algorithm 400 begins in step 402. In step 404, the controller receives position, heading, speed, and geofence data from onboard or offboard the vehicle. If the vehicle is within the geofence, in step 406, the algorithm 400 moves to step 408. The controller may determine whether the crowd density is above the crowd density threshold. For example, the crowd density threshold may require the crowd density to be above a typical crowd density for the particular area or a generic baseline.

If the crowd density is above the threshold, the vehicle will move to step 410. In step 410, the controller determines the heading based speed limit. The algorithm displays the speed limit to an operator or passenger in step 412. In step 414, the controller determines whether the vehicle is traveling above the heading based speed limit. If the vehicle is above the heading based speed limit, the controller will limit the powertrain or engage the brake systems shown in FIG. 1 to govern the vehicle, in step 416. In step 418, government agencies or other occupants may be notified that the vehicle has exceeded the geofence speed limit.

The processes, methods, logic, or strategies disclosed may be deliverable to and/or implemented by a processing device, controller, or computer, which may include any existing programmable electronic control unit or dedicated electronic control unit. Similarly, the processes, methods, logic, or strategies may be stored as data and instructions executable by a controller or computer in many forms including, but not limited to, information permanently stored on various types of articles of manufacture that may include persistent non-writable storage media such as ROM devices, as well as information alterably stored on writeable storage media such as floppy disks, magnetic tapes, CDs, RAM devices, and other magnetic and optical media. The processes, methods, logic, or strategies may also be implemented in a software executable object. Alternatively, they may be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

The words used in the specification are words of description rather than limitation, and it is understood that various changes may be made without departing from the spirit and scope of the disclosure. As previously described, the features of various embodiments may be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. These attributes may include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and may be desirable for particular applications.

What is claimed is:

1. A vehicle comprising:
    a powertrain; and
    a controller configured to, responsive to being within a crowd density defined geofence having heading based speed limits, operate the powertrain according to the heading based speed limits such that, for a predefined region of a particular road, a maximum speed allowed by the heading based speed limits is less for headings toward a specified crowd density location than for headings away from the specified crowd density location, wherein the maximum speed allowed by the heading based speed limits is less for headings centripetal to a centroid of the geofence than for headings orbiting the centroid.

2. The vehicle of claim 1, wherein the maximum speed allowed by the heading based speed limits is less for distances closer to the location than for distances farther from the location.

3. The vehicle of claim 1, wherein the geofence is defined by the crowd density being above a crowd density threshold.

4. The vehicle of claim 3, wherein the crowd density threshold is based on an average attendee density of sectors within the geofence.

5. The vehicle of claim 1, wherein the crowd density is based on mobile device location data.

6. A vehicle comprising:
    a powertrain; and
    a controller configured to, responsive to being within a crowd density defined geofence having heading based speed limits, operate the powertrain according to the heading based speed limits such that, for a predefined region of a particular road, a maximum speed allowed by the heading based speed limits is less for distances closer to the location than for distances farther from the location, wherein the maximum speed allowed by the heading based speed limits is less for headings centripetal to a centroid of the geofence than for headings orbiting the centroid.

7. The vehicle of claim 6, wherein the maximum speed allowed by the heading based speed limits is less for headings toward a specified crowd density location than for headings away from the specified crowd density location.

8. The vehicle of claim 6, wherein the geofence defined by the crowd density being above a crowd density threshold.

9. The vehicle of claim 8, wherein the crowd density threshold is based on an average attendee density of sectors within the geofence.

10. The vehicle of claim 6, wherein the crowd density is based on mobile device location data.

11. A vehicle method comprising:
    responsive to being within a crowd density defined geofence having heading based speed limits, operating by a controller a powertrain according to the heading based speed limits such that, for a predefined region of a particular road, a maximum speed allowed by the heading based speed limits is less for headings toward a specified crowd density location than for headings away from the specified crowd density location, wherein the maximum speed allowed by the heading based speed limits is less for headings centripetal to a centroid of the geofence than for headings orbiting the centroid.

12. The method of claim 11, wherein the maximum speed allowed by the heading based speed limits is less for distances closer to the location than for distances farther from the location.

13. The method of claim 12, wherein the geofence is defined by the crowd density being above a crowd density threshold.

14. The method of claim 13, wherein the crowd density threshold is based on an average attendee density of sectors within the geofence.

\* \* \* \* \*